United States Patent [19]

Sobieski

[11] E Re. 31,519

[45] Reissued Feb. 7, 1984

[54] LEAD-IN SEAL AND LAMP UTILIZING SAME

[75] Inventor: John C. Sobieski, Gates Mills, Ohio

[73] Assignee: General Electric Company, Schenectady, N.Y.

[21] Appl. No.: 441,187

[22] Filed: Nov. 12, 1982

Related U.S. Patent Documents

Reissue of:

[64] Patent No.: 4,110,657
Issued: Aug. 29, 1978
Appl. No.: 776,850
Filed: Mar. 14, 1977

[51] Int. Cl.[3] ..... H01J 5/36

[52] U.S. Cl. ..... 313/332; 174/50.64; 313/331

[58] Field of Search ..... 174/50.64; 313/331, 313/332

[56] References Cited

U.S. PATENT DOCUMENTS

| | | | |
|---|---|---|---|
| 2,786,882 | 3/1957 | Krefft | 174/50.64 |
| 2,966,607 | 12/1960 | Thouret | 313/332 |
| 3,621,111 | 11/1971 | Danko | 313/332 |
| 3,685,880 | 8/1972 | Sobieski | 316/19 |
| 3,991,337 | 11/1976 | Notelteirs | 313/332 |
| 4,002,939 | 1/1977 | Van Bragt | 313/332 X |

FOREIGN PATENT DOCUMENTS

| | | | |
|---|---|---|---|
| 862192 | 1/1953 | Fed. Rep. of Germany | 174/50.64 |
| 1442497 | 7/1976 | United Kingdom | 313/332 |

*Primary Examiner*—Saxfield Chatmon
*Attorney, Agent, or Firm*—John F. McDevitt; Philip L. Schlamp; Fred Jacob

[57] ABSTRACT

A lead-in seal of the type having a metal foil seal member sealed into an envelope, comprising a relatively narrow intermediate foil tab member connected between the foil seal member and a conductor. The result is reduced stress in the seal and less likelihood of cracking.

12 Claims, 4 Drawing Figures

LEAD-IN SEAL AND LAMP UTILIZING SAME

Matter enclosed in heavy brackets [ ] appears in the original patent but forms no part of this reissue specification; matter printed in italics indicates the additions made by reissue.

BACKGROUND OF THE INVENTION

The invention is in the field of lamps and other devices having current lead-in conductors sealed in and through a bulb or envelope by means of current-conductive foil members.

U.S. Pat. No. 3,685,880 to John C. Sobieski, for example, discloses a lamp containing a pair of electrodes each connected to a separate lead-in conductor by a thin metal foil member, the foil members being hermetically sealed in the lamp envelope at seal regions, the end regions of the electrodes and lead-in conductors being embedded in the seal regions. The electrodes and lead-in conductors are attached to the respective foil members by positioning their end regions to overlap regions of the foil member, and spot welding these overlapped regions together. Typically, the lead-in conductors and the foil members are made of molybdenum, and, in an arc lamp, the electrodes are tungsten rods. To improve the spot-welded connections, both electrically and mechanically, small platinum-coated molybdenum foil pads have been placed at the spot-weld locations, between the molybdenum seal foil member and the tungsten electrodes and/or the molybdenum lead-in conductors, prior to spot welding. The improvement thus achieved is relatively greater for the welds of the foil member to the tungsten electrode rods. However, it has been found that this improvement in weld bonding is accompanied by an increased tendency for cracking of the envelope material at the seal region.

SUMMARY OF THE INVENTION

Objects of the invention are to provide an improved foil-type seal for lamps and the like, and to provide such a seal which has good electrical and mechanical properties, and good reliability of remaining intact without cracking.

The invention comprises, briefly and in a preferred embodiment, a lead-in seal having a thin conductive foil member sealed into an envelope, such as into a stem integral with a lamp bulb or housing, a thin conductive tab member attached to the foil member and extending therefrom, and an electrode attached to the extending portion of the tab member and extending into the interior of the lamp bulb, the attached end of the electrode being spaced from the adjacent edge of the foil. Preferably, the width of the tab member is about the same as the diameter of the electrode to which it is attached, and may be thicker than the foil, if required for conducting the lamp operating current without overheating. The tab preferably is shaped in the form of a double bend such that its end regions lie in parallel planes. In the preferred embodiment, the electrode is a tungsten rod, the tab member is a platinum-coated molybdenum foil, and the seal member is molybdenum foil, and a molybdenum lead-in conductor is attached to the seal foil at the end thereof opposite from the tab, the electrode and lead-in conductor being substantially axially aligned.

DESCRIPTION OF THE PREFERRED EMBODIMENT

Figure 1:
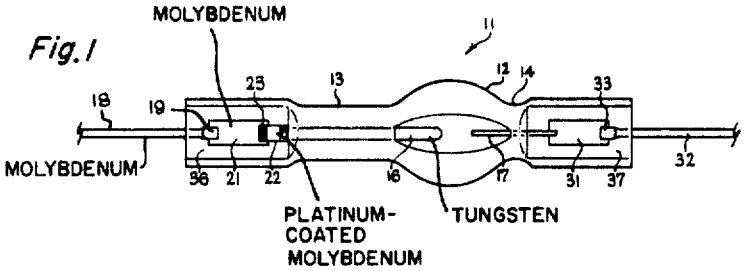
FIG. 1 is a top view of a compact high intensity arc lamp provided with a foil lead-in seal in accordance with a preferred embodiment of the invention.
Figure 2:
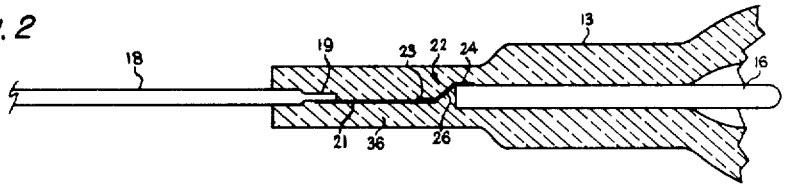
FIG. 2 is an enlarged side view of a lead-in seal region of the lamp of FIG. 1.

The compact high intensity arc lamp 11 in FIG. 1 comprises an envelope of quartz or other suitable vitreous material having a bulb portion 12 and stem portions 13 and 14 extending therefrom on opposite sides thereof, on a common axis. Elongated tungsten rod anode and cathode electrodes 16 and 17 are positioned on the axis of the lamp with the inner ends thereof spaced apart within the bulb portion 12, and respectively extend into the anode stem 13 and cathode stem 14. The tungsten anode rod 16 is part of the anode lead-in assembly, which further comprises a molybdenum lead-in wire 18 having an end 19 spaced from the outer end of the anode 16, the lead-in 18 and anode rod 16 being substantially axially aligned. The inner end region 19 of the lead-in wire 18 overlaps and is spot-welded to an end portion of a molybdenum thin foil member 21. The end region 19 of the lead-in wire may be swaged or otherwise flattened to facilitate a good weld. A thin foil tab member 22 has an end region 23 positioned to overlap a portion of the other end of the foil 21, and is spot-welded thereto. The remaining end region 24 of the tab 22 is positioned to overlap an end region of the anode rod 16, and is spot-welded thereto. Preferably, the tab 22 is provided with a double bend, as shown in FIG. 2, so that the end region 23 and 24 thereof lie in spaced apart parallel planes, so that the anode 16 and lead-in wire 18 will be substantially in axial alignment. The intermediate portion 26 of the tab 22 between its end regions 23 and 24 may be inclined at an angle of approximately 45° as shown in FIG. 2.

The outer end of the cathode rod 17 is shown spot-welded directly to a molybdenum seal foil 31, and a cathode lead-in wire 32, preferably of molybdenum, is spot-welded to the remaining end region of the foil 31, the welded end region 33 of the lead-in wire 32 having been flattened or swaged to facilitate the welding.

After the anode and cathode lead-in electrode assemblies have been prepared, they are properly positioned with their inner ends within the bulb portion 12, and the bulb is evacuated and filled with suitable gas, and a metal halide such as indium triiodide, if desired, and the end regions of the stems 13 and 14 are heated and flattened by pairs of jaws, for example as disclosed in the above-referenced Sobieski patent, to form anode and cathode seal regions 36 and 37, respectively, in which seal regions the quartz material of the bulb wets the foils 21 and 31, thus providing hermetic sealing.

The foil tab 22 of the invention is preferably molybdenum coated with platinum, similar to the spot-welding pads that have been used previously. The tab 22 preferably has a width approximately equal to the diameter of the tungsten rod 16 to which it is welded, and the tab 22 may be thicker than the seal foil 21, in order to adequately carry the operating current of the lamp without overheating. In a practical embodiment, the platinum-plated molybdenum tab 22 is 3/1000 of an inch thick, and the molybdenum sealing foil 21 is 9/10,000 of an inch thick.

The invention, comprising the elongated connector tab 22 between the sealing foil 21 and the electrode 16, achieves its objective of considerably reducing the number of seals 36 which crack during operation of the lamp, the anode seal 36 having been particularly prone to cracking. This achievement is believed due not only to the elongated feature of the tab 22, but also due to its double bend which provides the oblique intermediate section 26. Both of these features appear to reduce stress in the seal 36 after the lamp is completed. The reason for this improvement is believed due to a tendency for a stress to develop and remain in the seal region 36 when the former technique was employed of positioning a foil platinum-coated pad between the sealing foil 21 and electrode 16. Tabs similar to the tab 22 can be interposed between the foil 21 and lead-in wire 18, and between the foil 31 and electrode 17 and lead-in wire 32, respectively.

Figure 3:
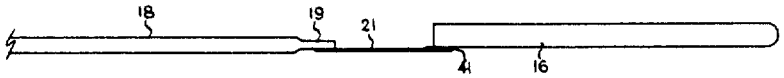
PRIOR ART Fig. 3
FIGS. 3 and 4 are side and top views, respectively, of a prior art type of foil seal arrangement.
Figure 4:
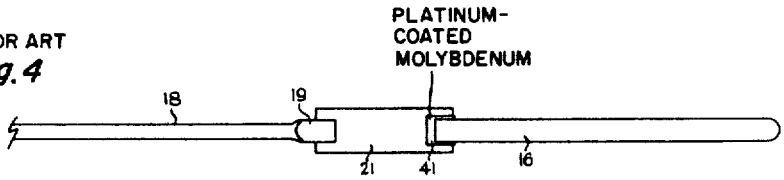
PRIOR ART Fig. 4

FIGS. 3 and 4 illustrate this prior construction, in which a platinum-coated molybdenum foil pad 41 was interposed between the weld regions of the anode 16 and the sealing foil 21 prior to the step of spot welding these members together. It is believed that during the spot welding, the foil pad 41 curled slightly upwardly at its edges, toward the round rod 16, causing narrow spaces between these curled edges and the sealing foil 21, and also narrow spaces between these curled edges and the electrode rod 16, and during the sealing operation the quartz material of the envelope was unable to adequately penetrate into and fill these narrow spaces, which resulted in setting up a stress in the seal. It should be noted that, due to its extreme hardness, it is relatively difficult to swage or flatten the spot-welded end of the tungsten rod 16, as can more readily be done at the spot-welded end 19 of the molybdenum lead-in wire 18, to provide a broader area of spot welding.

Another achievement of the invention is the prevention of corrosion of the molybdenum seal foil 21 by metal halide or other corrosive vapor contained in the bulb 12 and which can seep along the electrode 16 within the stem 13, to the outer welded end of the electrode. The platinum coating on the tab 22 resists corrosion, and the corrosion-prone molybdenum foil 21 is completely sealed and encased by the quartz housing material so the corrosive vapors cannot reach it. The use of a single platinum-coated foil interconnecting the members 16 and 18 is undesirable because platinum is not wetted by quartz as well as is bare molybdenum foil.

While preferred embodiments of the invention have been shown and described, various other embodiments and modifications thereof will become apparent to persons skilled in the art and will fall within the scope of the invention as defined in the following claims.

What I claim as new and desire to secure by Letters Patent of the United States is:

1. A seal comprising an envelope of vitreous material, a conductive foil seal member, an elongated electrical conductor positioned to have an end thereof axially spaced from an edge of said foil seal member, and a conductive foil tab member extending substantially axially between and interconnecting said foil seal member and said elongated conductor, said foil seal member being hermetically sealed in said material of the envelope, *said tab member being provided with a double bend to provide an angled intermediate region joining first and second end regions thereof which lie in parallel planes, said first end region overlapping and being attached to a region of said foil member and said second and region overlapping and being attached to the end region of said elongated conductor.*

2. A seal as claimed in claim 1, in which said tab member is elongated with one end region thereof overlapping and welded to a region of said foil seal member and the other end region thereof overlapping and welded to the end region of said conductor.

3. A seal as claimed in claim 1, in which said envelope material is quartz, said foil seal member is molybdenum, said elongated conductor is tungsten, and said tab member is platinum-coated molybdenum.

4. A seal as claimed in claim 1, in which the width of said tab member is narrower than the width of said seal member and is substantially equal to the width or diameter of said elongated conductor.

5. A seal as claimed in claim 4, in which said foil tab member is thicker than said foil seal member.

[6. A seal as claimed in claim 1, in which said tab member is provided with a double bend to provide an angled intermediate region joining first and second end regions thereof which lie in parallel planes, said first end region overlapping and being attached to a region of said foil seal member and said second end region overlapping and being attached to the end region of said elongated conductor.]

7. A lamp comprising an envelope of vitreous material, a conductive foil seal member, and first and second elongated electrical conductors, said foil seal member and conductors being aligned substantially axially with the foil seal member between the conductors, and means connecting the conductors to the foil seal member at opposed ends thereof, at least one of said means comprising an axial spacing between the foil seal member and one of said conductors, a conductive foil tab member extending substantially axially between the foil seal member and the last-mentioned conductor and connected thereto at respective opposed ends of the tab member, said foil seal member being hermetically sealed in said material of the envelope, said first elongated conductor extending within said envelope and said second elongated conductor extending out of said envelope, *said foil tab member being provided with a double bend to provide an angled intermediate region joining first and second end regions thereof which lie in parallel planes, said first end region overlapping and being attached to a region of said foil member and said second and region overlapping and being attached to the end region of said elongated conductor.*

8. A lamp as claimed in claim 7, in which said tab member is elongated with one end region thereof overlapping and welded to a region of said foil seal member and the other end region thereof overlapping and welded to the end region of the conductor.

9. A lamp as claimed in claim 7, in which said envelope material is quartz, said foil seal member is molydenum, said first conductor is tungsten, said tab member is platinum-coated molybdenum, and said second conductor is molybdenum.

10. A lamp as claimed in claim 7, in which the width of said tab member is narrower than the width of said seal member and is substantially equal to the width or diameter of said elongated conductor.

11. A lamp as claimed in claim 10, in which said foil tab member is thicker than said foil seal member.

[12. A lamp as claimed in claim 7, in which said foil tab member is provided with a double bend to provide an angled intermediate region joining first and second end regions thereof which lie in parallel planes, said first end region overlapping and being attached to a region of said foil seal member and said second end region overlapping and being attached to the end region of the conductor.]

13. A lamp as claimed in claim 7, in which said envelope comprises a bulb and a stem extending from said bulb, said hermetic sealing of the foil seal member being at the end region of said stem away from said bulb, said first elongated conductor extending through said stem and into said bulb, said second elongated conductor extending from said end of the stem, and said means connecting said first conductor to said foil seal member comprising said foil tab member extending between and connected to the foil seal member and first conductor.

*14. A lamp comprising an envelope of vitreous material, a conductive foil seal member, and first and second elongated electrical conductors, said foil seal member and conductors being aligned substantially axially with the foil seal member between the conductors, and means connecting the conductors to the foil seal member at opposed ends thereof, at least one of said means comprising an axial spacing between the foil seal member and one of said conductors, a conductive foil tab member extending substantially axially between the foil seal member and the last-mentioned conductor and connected thereto at respective opposed ends of the tab member, said foil seal member being hermetically sealed in said material of the envelope, said first elongated conductor extending within said envelope and said second elongated conductor extending out of said envelope, and in which said envelope material is quartz, said foil seal member is molybdenum, said first conductor is tungsten, said tab member is platinum-coated molybdenum, and said second conductor is molybdenum.*

* * * * *